(12) United States Patent
Dempski et al.

(10) Patent No.: US 8,856,146 B2
(45) Date of Patent: Oct. 7, 2014

(54) DEVICE FOR DETERMINING INTERNET ACTIVITY

(75) Inventors: Kelly L. Dempski, Evanston, IL (US);
Alexandre Naressi, Mougins (FR);
Fredrik Linaker, Antibes (FR); Robert Groenevelt, Juan les Pins (FR)

(73) Assignee: Accenture Global Services Limited, Dublin (IE)

( * ) Notice: Subject to any disclaimer, the term of this patent is extended or adjusted under 35 U.S.C. 154(b) by 135 days.

(21) Appl. No.: 13/180,036

(22) Filed: Jul. 11, 2011

(65) Prior Publication Data

US 2012/0066196 A1 Mar. 15, 2012

(30) Foreign Application Priority Data

Jul. 12, 2010 (EP) ..................... 10305771

(51) Int. Cl.
*G06F 7/00* (2006.01)
*G06F 17/30* (2006.01)
(52) U.S. Cl.
CPC ............... *G06F 17/30864* (2013.01)
USPC ............ 707/751; 707/722; 705/319
(58) Field of Classification Search
CPC .............................. G06F 17/30864
USPC ................. 707/722, 751; 705/319
See application file for complete search history.

(56) References Cited

U.S. PATENT DOCUMENTS

| | | | |
|---|---|---|---|
| 6,233,618 B1 * | 5/2001 | Shannon ................ | 709/229 |
| 6,470,383 B1 * | 10/2002 | Leshem et al. ........... | 709/223 |
| 6,493,703 B1 * | 12/2002 | Knight et al. ............ | 1/1 |
| 7,146,416 B1 * | 12/2006 | Yoo et al. ............... | 709/224 |
| 7,565,345 B2 * | 7/2009 | Bailey et al. ............. | 1/1 |
| 8,209,277 B2 * | 6/2012 | Kumar et al. ............ | 706/46 |
| 2002/0059258 A1 | 5/2002 | Kirkpatrick | |
| 2002/0069116 A1 * | 6/2002 | Ohashi et al. ............ | 705/26 |
| 2005/0071255 A1 | 3/2005 | Wang | |
| 2005/0246391 A1 * | 11/2005 | Gross .................. | 707/200 |
| 2009/0182725 A1 | 7/2009 | Govani | |
| 2009/0319484 A1 | 12/2009 | Golbandi | |

FOREIGN PATENT DOCUMENTS

| | | |
|---|---|---|
| WO | 2007042840 A1 | 4/2007 |
| WO | 2007047971 A2 | 4/2007 |

OTHER PUBLICATIONS

Search Report issued in EP Application No. 10305771 on Nov. 2, 2010.

* cited by examiner

*Primary Examiner* — Cheyne D Ly
(74) *Attorney, Agent, or Firm* — Mannava & Kang, P.C.

(57) ABSTRACT

The invention concerns a method of determining, by an electronic processing device coupled to the internet, a score ($S_i$) indicating the amount of internet activity associated with a subject, the method comprising: receiving one or more search terms relating to said subject, and initiating a search via the internet for items of digital content relating to said one or more search terms; identifying from results of said search a plurality of items of digital content; for each of said plurality of items of digital content, requesting, from at least one digital content sharing site (412, 414), activity data indicating at least the number of times said item of media content has been accessed; and calculating said score based on the activity data for each of said plurality of items of digital content.

14 Claims, 3 Drawing Sheets

DEVICE FOR DETERMINING INTERNET ACTIVITY

FIELD OF THE INVENTION

The present invention relates to a method and device for determining a score for internet activity associated with a subject.

BACKGROUND TO THE INVENTION

FIG. 1 shows an example of part of an interconnected network 100 of computers 102 and servers 104, using the internet protocol suite, and that together form a small portion of the internet. One or more of the servers 104 may host digital content, such as web pages, accessible by users of the computers 102. One or more of the servers may also act as an internet service provider for groups of the computers 102. The computers 102 could include laptops, PC's (personal computers), mobile telephones with internet access, and other mobile devices able to access the internet.

In recent years there has been a growth in the use of websites that allow users to voice opinions on public forums hosted on the internet. For example, websites such as Twitter and Facebook (the names "Twitter" and "Facebook" are likely to be registered trademarks) allow users to make comments and add links to articles, expressing positive or negative opinions on a wide range of subjects. Such comments and opinions may be relayed very quickly through the internet, propagated by users through the servers 104 and computers 102 of the network 100, often in just a matter of hours.

It would be advantageous to be able to monitor the rapid growth of internet activity regarding a given subject. However, there is a technical problem in tracking this type of activity over the internet.

SUMMARY OF THE INVENTION

It is an aim of the present invention to at least partially address one or more problems in the prior art.

According to one aspect of the present invention, there is provided a method of determining, by an electronic processing device coupled to the internet, a score indicating the amount of internet activity associated with a subject, the method comprising: receiving one or more search terms relating to said subject, and initiating a search via the internet for items of digital content relating to said one or more search terms; identifying from results of said search a plurality of items of digital content; for each of said plurality of items of digital content, requesting, from at least one digital content sharing site, activity data indicating at least the number of times said item of media content has been accessed; and calculating said score based on the activity data for each of said plurality of items of digital content.

According to one embodiment, the method further comprises comparing the score with a threshold value, and based on said comparison, requesting again, after a time delay, further activity data from said at least one digital content sharing site, and calculating a further internet activity score based on the further activity data.

According to another embodiment, the method further comprises comparing the further internet activity score with said score to determine a trend in the internet activity associated with the subject and generating an alert based on said comparison.

According to another embodiment, the method further comprises automatically performing an action based on said score. For example, the action comprises one or more of: publishing a further item of digital content on the internet; making a price alteration of a product related to said subject; and transmitting a request that said item of digital content be made unavailable on the internet.

According to another embodiment, the step of identifying from the results of said search a plurality of items of digital content comprises identifying an address of each of said items, and wherein said request for activity data comprises providing said address to said at least one digital content sharing site.

According to another embodiment, the activity data further indicates one or more of:

the number of times said item of digital content was shared with other users; and the number of users that expressed an opinion or commented on the item of media content.

According to another embodiment, the method further comprises determining a sentiment of at least one of said items of digital content.

According to another embodiment, the method further comprises generating a recommended action based on said determined sentiment and said determined trend.

According to another embodiment, the method further comprises generating at least one further search term based on said items of digital content, and initiating a further search via the internet for items of digital content relating to said further search term.

According to a further aspect of the present invention, there is provided an electronic processing device for determining a score indicating the amount of internet activity associated with a subject, the device comprising: a user interface arranged to receive one or more search terms relating to said subject, and to initiate a search via the internet for items of digital content relating to said one or more search terms; an activity determination unit arranged to: identify from results of said search a plurality of items of digital content; for each of said plurality of items of digital content, to request, from at least one digital content sharing website, activity data indicating at least the number of times said item of media content has been accessed; and to calculate said score based on the activity data for each of said plurality of items of digital content.

According to one embodiment, the activity determination unit is further arranged to: compare said score with a threshold value, and based on said comparison, to request again, after a time delay, further activity data from said at least one digital content sharing site; to calculate a further internet activity score based on the further activity data; and to generate an alert if said comparison indicates an increase in said internet activity.

According to a further embodiment, the user interface is further adapted to display the score.

According to a further embodiment, the activity determination unit is arranged to track user actions in response to said score, and to generate a new internet activity score to evaluate effectiveness of said actions.

According to a further aspect of the present invention, there is provided a system comprising the above electronic processing device, at least one search engine arranged to receive said search terms and to provide search results indicating said plurality of items of media content, and at least one digital content sharing site, arranged to receive from said electronic processing device a request for activity data, and to provide said activity data relating to each of said plurality of items of digital content.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF EMBODIMENTS OF THE PRESENT INVENTION

In the following, only features and aspects that are useful to an understanding of the invention are discussed in detail. Other features, such as the implementation of the content sharing sites, and ways of determining sentiment in an article, have not been described in detail, the implementation of such features being within the normal capabilities of those skilled in the art.

Throughout the present description, the following terms will be given the associated definitions:

- digital content—any webpage, article, video, blog posting, or other digital media capable of expressing opinion on a given subject;
- content sharing site—any site that allows digital content to be viewed, shared, recommended, commented etc. between users. Examples include Twitter and Facebook;
- activity data—data indicating at least the number of times that an item of digital content has been accessed, and optionally also the number of times that the item has been recommended, commented on, shared etc.
- internet activity—any action of accessing, sharing, recommending or commenting, via the internet, content on a given subject;
- internet activity score—a value or set of values indicating internet activity in relation to a subject, which provides a gauge for the internet loudness of the subject, which could be referred to as the social amplitude of the subject;
- blog—online space used by a certain user to write postings, comments, and links to content items etc.

Figure 1:
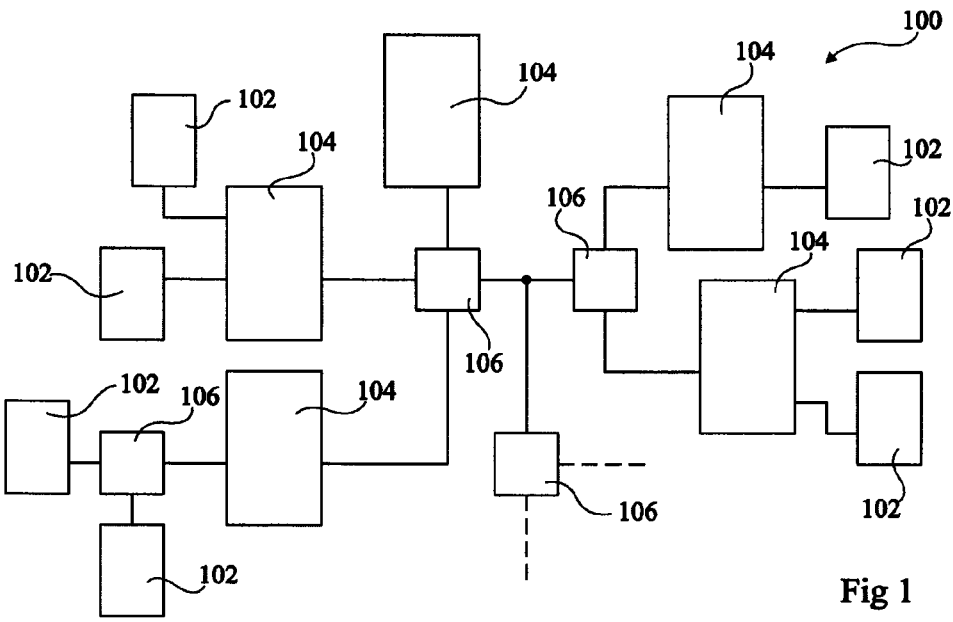
FIG. 1 (described above) illustrates an example of a portion of the internet.
Figure 2:
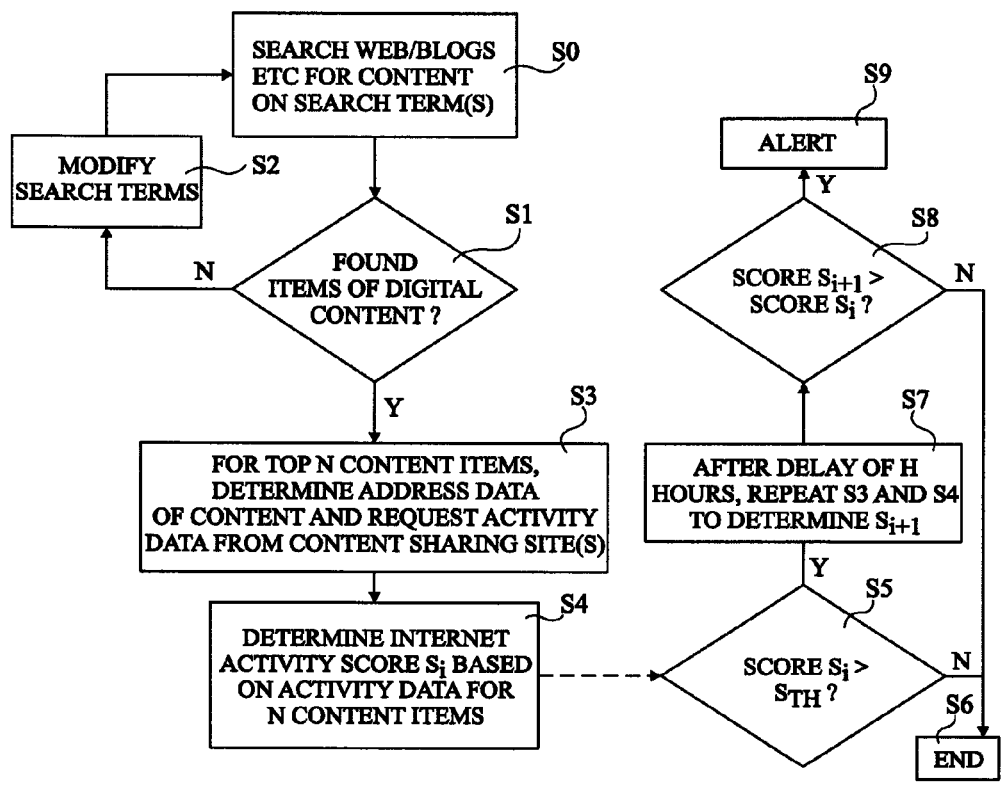
FIG. 2 is a flow diagram illustrating steps in a method of determining an internet activity score according to an embodiment of the present invention.

FIG. 2 is a flow diagram illustrating steps in a method for determining an internet activity score in relation to a subject.

In a first step S0, an internet search for digital content is performed, for example on web pages, blogs etc., based on one or more search terms relating to a subject. For example, the subject could be a brand name, which is also the main search term. Alternatively, the subject could be a new product launched by a company, for which it is wished to monitor internet activity, and the company name and product name could form the search terms.

The search is for example made by an existing search engine available online, such as a "Google" search ("Google" is likely to be a registered trademark), although a dedicated search engine could be implemented to perform this search. The search is for example limited in time, in other words retrieving only content made available on the internet for the first time in the recent past, for example in the previous 24 hours.

In a next step S1, it is determined whether at least two items of digital content have been found by the search. For example, an item of digital content could include web pages, blogs, articles, video, images or other digital media. The search preferably ranks the results of the search based for example on the number of the search terms present in the digital content, and/or other criteria.

If no items have been found, the next step is S2, in which the search terms may be automatically modified before a new search is performed in step S0, for example to correct spelling errors. Spelling changes could alternatively or additionally be suggested to a user via a user interface.

If in step S1 at least two items of digital content have been found, the next step is S3, in which a request is made to content sharing sites for activity data indicating internet activity associated with the content. In particular, preferably for a number N of the most relevant items of digital content returned by the search, address data of the content is obtained, and a request including this address data is used to retrieve activity data for the content from one or more content sharing websites. Alternatively, requests can be made in respect of all the items of digital content. Alternatively, if the search results include only recently entered or updated data, for example articles, blogs or comments posted in the past 24 hours, the number of hits is likely to be relatively low, and all the results can be analysed.

The address data is for example the URL (Uniform Resource Locator) of the webpage containing the digital content. The activity data indicates the number of users who have accessed the item of digital content, and/or the number of times the item of digital content was shared with other users and/or the number of users that expressed an opinion or commented on the item of digital content.

In a next step S4, an internet activity score $S_1$ is determined based on the activity data for all of the N digital content items.

In one example, the activity data may comprise a count value indicating the number of times different users view, express an opinion on or share an item of digital content. Thus the activity data for each item of content could simply be a single value indicating the total number of users who have been exposed to the digital content. In this case, the activity score could be the sum of all of the activity data values for each item of content.

Alternatively, more complicated algorithms could be used to determine the internet activity score for the subject, for example by applying different weightings to the various types of actions, and/or applying different weightings to different content sharing web sites. As an example based on the Facebook social networking site, when a user shares the item of content, this could be associated with a high weighting of 3. When a user comments an item, this could be associated with a lower weighting of 2. When a user expresses a like in relation to the item, this can be weighted with just 1, as it requires little effort for a user to indicate a like. Thus, an item that is heavily commented may have a higher internet activity score than one which is heavily liked.

The method may end at step S4, the internet activity score for example being displayed via a display to a user. Alternatively, after step S4, steps S5 to S8 may be performed, as will now be described.

In step S5, the score $S_i$ determined in step S4 is compared to a threshold score $S_{TH}$. The threshold score is for example chosen such that no further actions are taken in respect of internet activity that can be considered to be negligible. For example, if an item of digital content has been accessed less that 1000 times, such an item could be considered to have a low impact on the brand image of the subject, and could be ignored. The threshold may be set for a given subject. For example, some subjects may interest only a small sub-set of internet users, and thus very low internet activity levels could be expected. In this case, a relatively low threshold $S_{TH}$ can be set. Alternatively, other subjects may always interest the internet community, in which case a relatively high threshold $S_{TH}$ can be set. In some cases, the threshold could be set based on an average of internet activity scores for the subject over the past few hours or days.

If in step S5 the score $S_1$ is determined to be below the threshold $S_{TH}$, the next step is S6 in which the method ends. Alternatively, the next step is S7.

In step S7, a delay of H hours is imposed, for example 3 hours, and then steps S3 and S4 described above are automatically repeated to generate a new score $S_{i+1}$.

Next, in step S8, the new score $S_{i+1}$ is compared to score $S_i$. In this way, the trend of internet activity concerning the subject can be determined. Based, on this comparison, an alert is selectively generated and displayed to a user in step S9. Otherwise, the next step is S6, in which the method ends.

The comparison in step S8 may be simply whether score $S_{i+1}$ is higher that $S_i$. This may be appropriate in that case that the activity data includes a time factor. For example, the activity data may indicate the number of accesses, shares, comments etc. in the past 2 hours. In this case, a score $S_{i+1}$ that is higher than $S_i$ would indicate a growing internet activity, and could lead to the generation of the alert in S9.

Alternatively, the activity data may indicate a total number of accesses, shares, comments etc. in relation to the digital content. In this case, it may be determined in S8 whether score $S_2$ is much greater than $S_1$. As an example, if score $S_2$ is more than 20 percent higher than $S_1$, this could indicate a rapidly growing activity.

Figure 3:
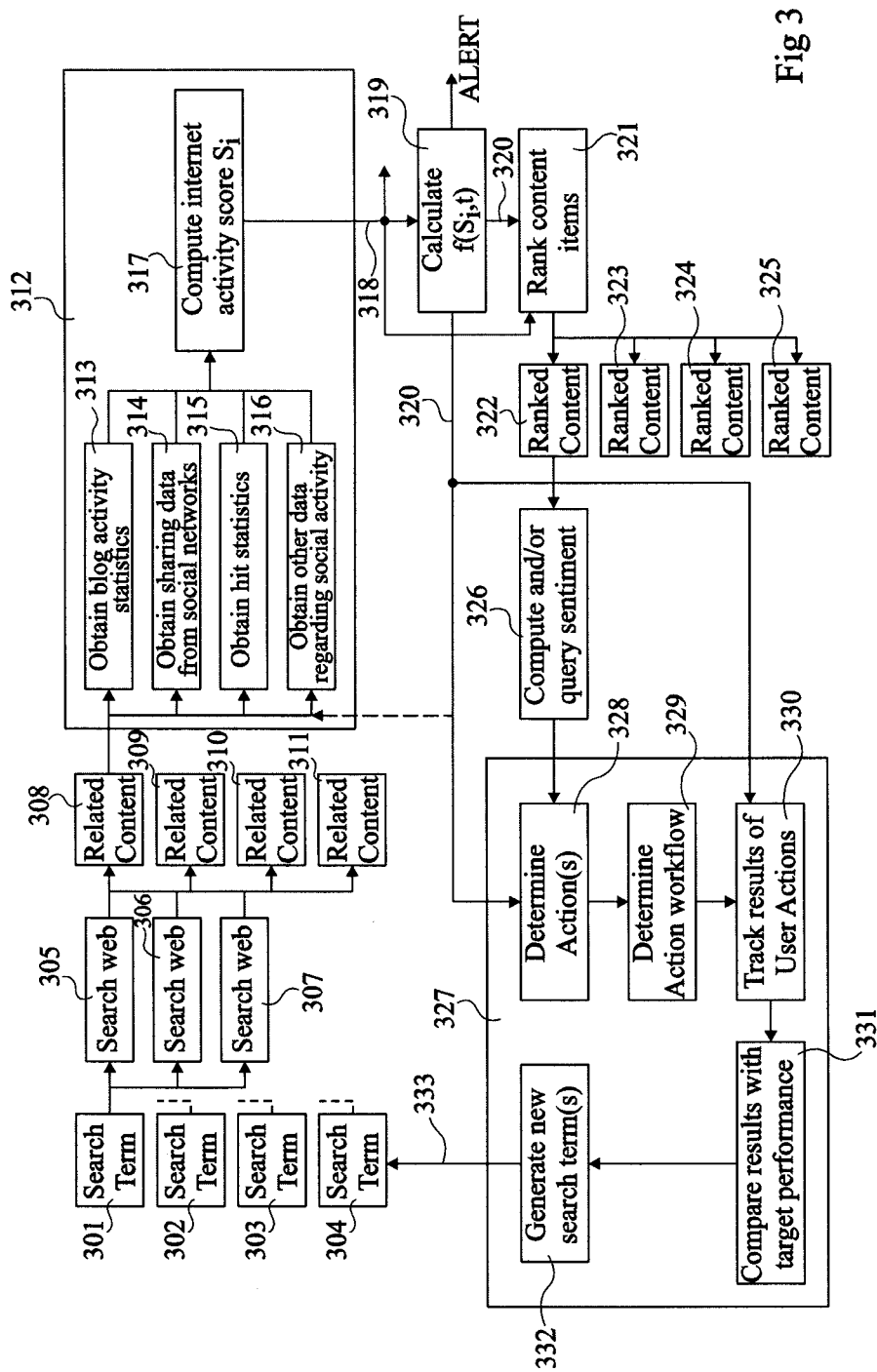
FIG. 3 is a block diagram illustrating functionality of a system for determining an activity score according to an alternative embodiment of the present invention.

FIG. 3 is a block diagram illustrating functionality of a system for determining an activity score according to an alternative embodiment.

As illustrated, one or more search terms 301, 302, 303 are entered into the system, and are used as inputs to a number of search functions 305, 306 and 307. The search functions 305, 306 and 307 respectively correspond in this example to a web search, a search of blogs, and other types of searches. For example the web search 305 could be a general internet search, such as the "Google" search, while the blog search 306 could be a search restricted to searching posts made on certain blogging websites. The other types of search 307 may be aimed at searching types of media such as video or sound.

The searches 305 to 307 return a number of items of related digital content, in this example four items 308 to 311. For example, the content is identified by its URL address, or by other identifying information. This identifier is provided to an internet activity monitoring block 312. In some cases, the URL can be provided to a website such as bit.ly (which is likely to be a registered trademark) to obtain an alternative shorter URL for providing to the internet activity monitoring block 312.

The block 312 performs a number of operations 313 to 316 to obtain activity data relating to the digital content. In particular, in block 313, blog activity statistics are obtained, which for example provide the number of blogs referring or linking to a given item of digital content. In block 314, sharing data is obtained from social networks. For example, this data indicates the number of times a given item of digital content has been shared, meaning that it is recommended to friends of users in the social network. The data may also comprise the number of times users of the social network have expressed a "like" in regards each item of content, in other words, they have informed their friends of a positive sentiment towards the item. In block 315, hit statistics are obtained, that indicate the number of times a webpage containing a given item of media content has been accessed. For example, websites such as bit.ly are able to provide this type of data. In block 316, other data is obtained regarding social activity in regards to an item of digital content. For example, the data could be the number of comments and/or views on the video sharing site YouTube, the number of comments on a blog, the number of shares on other sites such as dig, etc.

Each of the blocks 313 to 316 obtains activity data in relation to each item of digital content 308 to 311, and provides this data to a block 317, where the internet activity score $S_i$ is generated. As explained above in relation to step S4 of FIG. 2, the internet activity score may be calculated based on a range of algorithms applied to the activity data provided by blocks 313 to 316. The score is output from the internet activity monitoring block 312 on a line 318.

The score on line 318 is for example output directly to be displayed to a user. Furthermore, the score is provided to a block 319, which stores a window of historical scores, such that a function $f(S_i,t)$ can be calculated to indicate a trend of internet activity scores $S_i$ over time. This function could generate a single value indicating the trend, such a value between −1 and 1, where 0 indicates a stable activity, −1 indicates an internet activity that has disappeared, and 1 indicates an internet activity that has greatly increased, for example doubled, over a given period such as 3 hours. Alternatively, the function could provide a number of values indicating the progression of internet activity over time.

As shown by a dashed line, the activity data in relation to the related digital content items 308 to 311 is for example obtained by blocks 313 to 316 at regular periods, such as every 20 minutes. In this way, new activity scores $S_i$ are generated, and allow the trend to be determined. This repeated generation of the activity scores is for example only performed when the activity score is over a certain threshold, in a similar fashion to step S5 of FIG. 2. Furthermore, in a similar fashion to step S9 of FIG. 2, block 319 may generate an alert if the trend is found to be rapidly increasing.

In addition to an overall internet activity score for a given subject, activity scores for each of the items of digital content may be provided by block 312, and corresponding trends for each item can be calculated by block 319. This allows the content items to be ranked by a block 321, which receives the trend information from block 319 on a line 320, and also the activity scores for each item on line 318.

For example, the digital content items 308 to 311 are ranked in order based on their respective internet activity increases, and block 321 thus outputs a ranked list 322 to 325 of content, that is for example displayed to a user. Alternatively or additionally, the digital content items 308 to 311 can be ranked in order based on their current corresponding internet activity scores.

Next, a block 326 for example computes, and/or queries from a user, the sentiment of the top ranked items of digital content. For example, each of the N top ranked items of digital content is classified as expressing a positive, neutral, or negative opinion of the author, where N is for example in the range 5 to 20. The opinion is for example automatically determined by certain words or terms used in relation to the search terms.

Alternatively, for some items such as video, a user may be interrogated as to whether the sentiment is positive, neutral or negative.

The sentiment, along with the information regarding the trend of internet activity determined by block 319, is provided to a response unit 327.

A block 328 of unit 327 determines actions to be taken in response to the detected internet activity and sentiment, and recommends these actions to a user. For example, if the internet activity on a given subject is found to be increasing, and the digital content is found to express a negative sentiment, the recommended action could be to take counter measures, such as selecting and publishing on the internet digital content having positive sentiment in regards the subject. Alternatively, if the digital content is found to express a positive sentiment, but the internet activity is very low, the recommended action could be to boost the internet activity, for example by posting more links to the digital content on various blogs and social networks.

The actions are for example recommended to a user via a user interface, and then performed by the user. However, in some cases, some or all of the responsive actions to a given activity score or trend may be automatically performed by the system. For example, an action could be to automatically release a new advert when the activity regarding a previous advert has started to fade. In this case, block 328 may monitor the trend of activity scores generated by block 319 in relation to the subject of the previous advert, and automatically release the new advert when the activity scores starts to decrease. Alternatively, if there is an increasing negative sentiment with regards price of a product, a price reduction or discount coupon could be automatically released. As yet a further example, an article could be automatically published under certain conditions. The article could be a negative review of a competitor's product or a negative story regarding a political opponent, and this could be automatically released if the competitor's product or political opponent has an increasing internet activity score.

Next, in a block 329, an action workflow is determined, identifying the actions to be taken. The workflow could be linked to a given time scale. For example, based on the trend of the internet activity score, a time scale for the recommended actions may be set out such that if the internet activity score is rapidly growing in relation to negative sentiment, an urgent response timeframe could be recommended, whereas for slowly growing internet activity in relation to positive sentiment, a slower response may be acceptable.

Next, in a block 330, the result of the actions are tracked. In particular, if in response to recommendations made in block 328, a user performs actions such as posting comments on a blog, these actions are logged. Actions performed automatically may additionally or alternatively be logged. Then, a determined time period after these actions, such as 3 hours later, the trend in the internet activity score provided on line 320 from block 319 for the items of digital content is re-evaluated.

Then, in a block 331, the tracked results from block 330 are compared to target performance thresholds. In particular, the target performance is for example a key performance indicator (KPI), indicating for example the target internet activity in relation to certain digital content items within a given time frame. If it is determined that the target performance is not being met, further actions could be made automatically and/or recommendations for additional actions could be made.

Next, in a block 332, new search terms are generated if appropriate. For example, whereas the search terms may have been originally been aimed at a relatively broad subject, such as a new product, the highest ranked digital content may relate to a particular feature or fault concerning the product. In this case, the search terms can be modified to include keywords corresponding to this feature or fault, to make the detection of corresponding digital content more likely.

Next, as shown by arrow 333, the initial search is repeated, based for example on the original search terms 301 to 303, and optionally on one or more additional search terms 304 generated by block 332.

Figure 4:
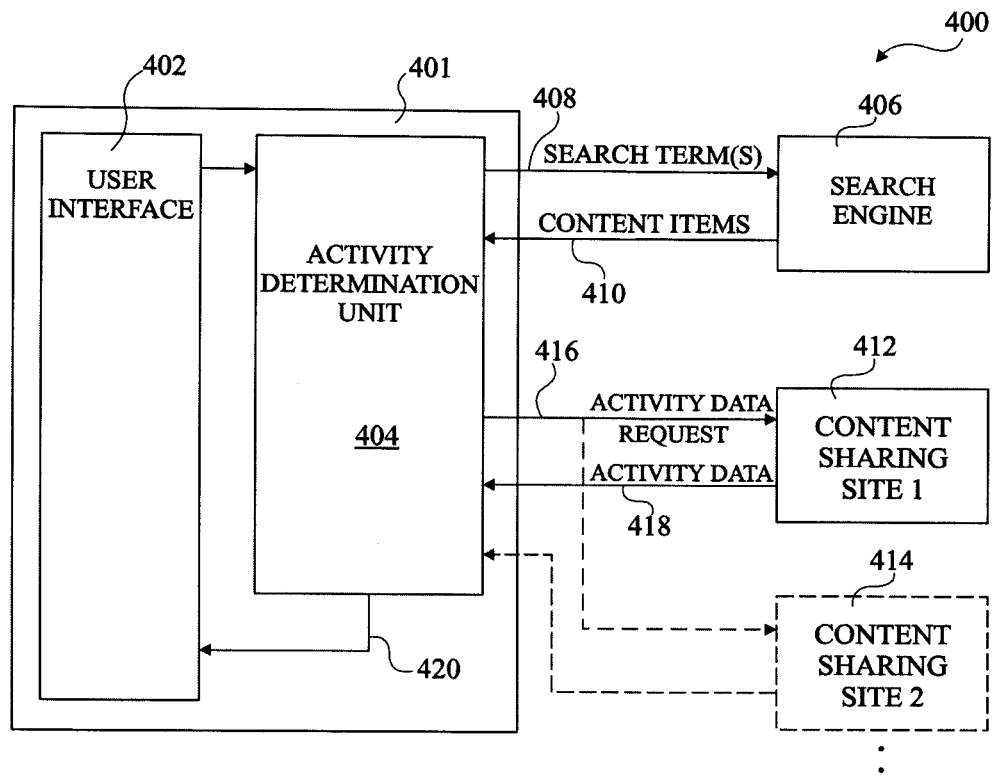
FIG. 4 schematically illustrates a system for determining an activity score according to an embodiment of the present invention.

FIG. 4 illustrates a system 400 for determining an interne activity score associated with a subject, for example implementing the methods of FIG. 2 or 3.

A computing device 401 comprises a user interface 402 and an activity determination unit 404.

Unit 404 communicates with a search engine 406, and in particular supplies one or more search terms entered by the user via the user interface 402 over a connection 408. The search engine 406 responds by providing information identifying a plurality of content items over a connection 410 to unit 404.

Unit 404 also communicates with a content sharing site 412, and optionally one or more further content sharing sites 414 shown by dashed lines in FIG. 4. An activity data request is generated by unit 404 and provided to site 412 over a connection 416. The request for example includes the identifiers of the digital content provided by the search engine 406, such as a URL, or other information. The site 412 responds by providing activity data concerning the items of digital content via a connection 418. Similar request can be made to and from other content sharing sites.

The activity determination unit 404 receives the activity data from the sites 412, 414, and processes the data to generate the internet activity score in relation to the subject, which is for example provided for display to the user interface 402 on an output line 420. Unit 404 may additionally perform the other functions described in relation to FIGS. 2 and 3, such as generating alerts, recommending actions, generating new search terms, etc.

Figure 5:
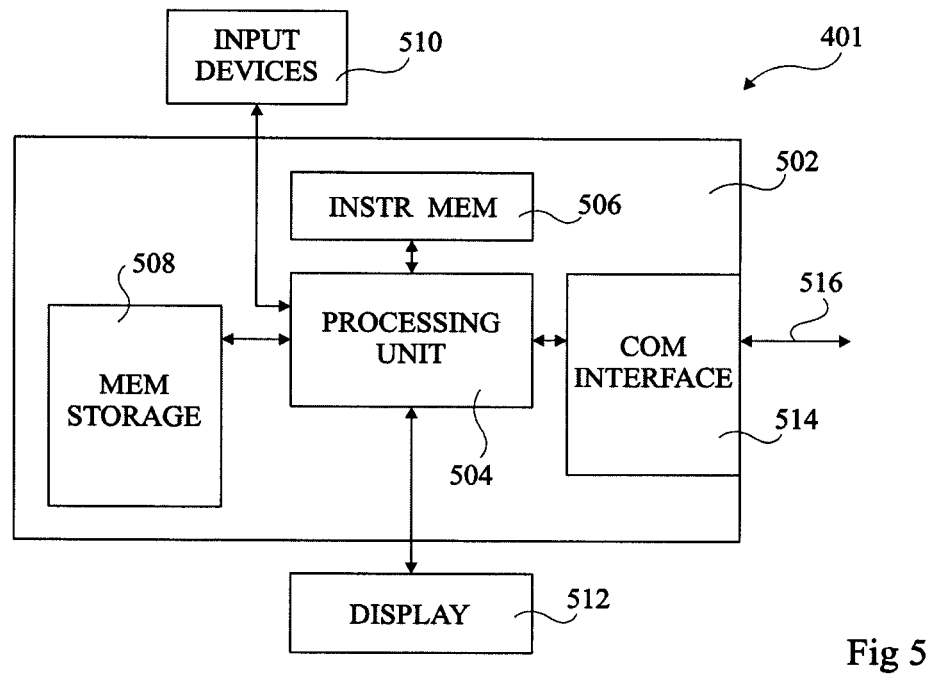
FIG. 5 schematically illustrates an electronic device implementing part of the system of FIG. 4 according to an embodiment of the present invention.

FIG. 5 illustrates schematically an example of a hardware implementation of the computation device 401 of FIG. 4. As illustrated, a computing device 502 comprises a processing unit 504 controlled by an instruction memory 506 to perform operations implementing the method of FIG. 2 or 3. Furthermore, memory storage 508, which may include cache memory, RAM memory, one or more hard disk drives, or other types of memory storage, is provided for storing previously calculated activity scores. Input devices 510, such as a keyboard and mouse, are also coupled to the processing unit 504, and a display 512 is provided for displaying scores and action recommendations to a user. A communication interface 514 allows connection via a line 516 to the internet, for initiating the search based on the search terms, and requesting activity data from the digital content sharing websites. Line 516 could be a LAN connection, such as Ethernet line, an ADSL or cable connection, or a wireless connection.

An advantage of the embodiments described herein is that, by performing an internet search to find items of digital content, and then retrieving activity data related to these items from content sharing websites, an accurate indication of internet activity for a given subject can be obtained in a quick and simple fashion. Furthermore, by obtaining the activity data at regular periods, the trend in time of the internet activity can further be evaluated, allowing an alert to be generated under certain conditions.

A further advantage of embodiments described herein is that by comparing the internet activity score with a threshold, additional searches may be performed automatically only in relation to subjects that do not have negligible activity, therefore avoiding unnecessary searching. Furthermore, additionally or alternatively one or more actions may be performed automatically based on the score. For example, these actions could be performed based on a comparison of the trend of the internet score with one or more threshold values.

While a number of specific embodiments of the invention have been described with reference to the figures, it will be apparent to those skilled in the art that there are numerous modifications and variations that may be applied.

For example, it will be apparent to those skilled in the art that the activity data is not limited to the examples described herein, but could comprise other indications of internet activity. Also, it will be apparent that the internet activity score may be generated based on one of a broad range of algorithms using the activity data, an appropriate algorithm for example being selected based on the nature of the activity data that is retrieved.

Furthermore, it will be apparent to those skilled in the art that the various features described herein in relation to the various embodiments could be combined in any combination in alternative embodiments of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of determining, by an electronic processing device coupled to the internet, a score indicating an amount of internet activity associated with a subject, the method comprising:

receiving, by the electronic processing device, one or more search terms relating to said subject, and initiating a search via the internet for items of digital content relating to said one or more search terms;

selecting, by the electronic processing device, from results of said search a plurality of items of digital content;

for each of said plurality of items of digital content, requesting, by the electronic processing device from at least one digital content sharing site, activity data indicating a number of times said item of digital content has been accessed, a number of times said item of digital content was shared with other users, and a number of users that expressed an opinion or commented on the item of digital content; and calculating, by the electronic processing device, said score based on the activity data for each of said plurality of items of digital content, wherein the calculating includes inputting the number of times said item of digital content has been accessed, the number of times said item of digital content was shared with other users, and the number of users that expressed an opinion or commented on the item of digital content to a function to calculate said score.

2. The method of claim 1, further comprising comparing said score with a threshold value, and based on said comparison, requesting again, after a time delay, further activity data from said at least one digital content sharing site, and calculating a further internet activity score based on the further activity data.

3. The method of claim 2, further comprising comparing said further internet activity score with said score to determine a trend in the internet activity associated with said subject, and generating an alert based on said comparison.

4. The method of claim 1, further comprising automatically performing an action based on said score.

5. The method of claim 4, wherein said action comprises one or more of:

publishing a further item of digital content on the internet;

making a price alteration of a product related to said subject; and transmitting a request that said item of digital content be removed from the internet.

6. The method of claim 1, wherein said step of identifying, from the results of said search, a plurality of items of digital content comprises identifying an address of each of said items, and wherein said request for activity data comprises providing said address to said at least one digital content sharing site.

7. The method of claim 3, further comprising determining a sentiment of at least one of said items of digital content.

8. The method of claim 7, further comprising generating a recommended action based on said determined sentiment and said determined trend.

9. The method of claim 1, further comprising generating at least one further search term based on said items of digital content, and initiating a further search via the internet for items of digital content relating to said further search term.

10. An electronic processing device for determining a score indicating an amount of internet activity associated with a subject, the device comprising:
   a user interface arranged to receive one or more search terms relating to said subject, and to initiate a search via the internet for items of digital content relating to said one or more search terms;
   an activity determination unit arranged to:
   select from results of said search a plurality of items of digital content;
   for each of said plurality of items of digital content, to request, from at least one digital content sharing website, activity data indicating a number of times said item of digital media content has been accessed, a number of times said item of digital content was shared with other users, and a number of users that expressed an opinion or commented on the item of media content; and
   calculate said score based on the activity data for each of said plurality of items of digital content, wherein to calculate the score includes inputting the number of times said item of digital content has been accessed, the number of times said item of digital content was shared with other users, and the number of users that expressed an opinion or commented on the item of digital content to a function to calculate said score.

11. The electronic processing device of claim 10, wherein said activity determination unit is further arranged to:
   compare said score with a threshold value, and based on said comparison, to request again, after a time delay, further activity data from said at least one digital content sharing site;
   to calculate a further internet activity score based on the further activity data; and
   to generate an alert if a comparison of said further internet activity score with said score indicates an increase in internet activity.

12. The electronic processing device of claim 10, wherein said user interface is further adapted to display said score.

13. The electronic processing device of claim 12, wherein said activity determination unit is arranged to track user actions in response to said score, and to generate a new internet activity score to evaluate effectiveness of said actions.

14. A system comprising:
   an electronic processing device to determine a score indicating an amount of internet activity associated with a subject, the electronic processing device comprising:
      a user interface arranged to receive one or more search terms relating to said subject, and to initiate a search via the internet for items of digital content relating to said one or more search terms;
      an activity determination unit arranged to:
      select from results of said search a plurality of items of digital content;
      for each of said plurality of items of digital content, to request, from at least one digital content sharing website, activity data indicating a number of times said item of digital media content has been accessed, a number of times said item of digital content was shared with other users, and a number of users that expressed an opinion or commented on the item of media content; and
      calculate said score based on the activity data for each of said plurality of items of digital content, wherein to calculate the score includes inputting the number of times said item of digital content has been accessed, the number of times said item of digital content was shared with other users, and the number of users that expressed an opinion or commented on the item of digital content to a function to calculate said score; and
   at least one search engine arranged to receive said search terms and to provide search results indicating said plurality of items of media content, and at least one digital content sharing site, arranged to receive from said electronic processing device a request for activity data, and to provide said activity data relating to each of said plurality of items of digital content.

* * * * *

UNITED STATES PATENT AND TRADEMARK OFFICE
CERTIFICATE OF CORRECTION

| | |
|---|---|
| PATENT NO. | : 8,856,146 B2 |
| APPLICATION NO. | : 13/180036 |
| DATED | : October 7, 2014 |
| INVENTOR(S) | : Dempski et al. |

Page 1 of 1

It is certified that error appears in the above-identified patent and that said Letters Patent is hereby corrected as shown below:

On the title page item (30), the foreign application priority number should read "10305771.7".

Signed and Sealed this
Thirtieth Day of December, 2014

Michelle K. Lee
*Deputy Director of the United States Patent and Trademark Office*